United States Patent [19]

Gangemi

[11] 4,159,954

[45] Jul. 3, 1979

[54] ISOLATOR FILTER

[76] Inventor: Ronald J. Gangemi, 15598 Producer La., Huntington Beach, Calif. 92649

[21] Appl. No.: 880,802

[22] Filed: Feb. 24, 1978

[51] Int. Cl.² .............................................. B01D 25/04
[52] U.S. Cl. ..................................... 210/446; 210/489
[58] Field of Search ................. 210/446, 447, 488, 489

[56] References Cited

U.S. PATENT DOCUMENTS

| | | | |
|---|---|---|---|
| 1,680,323 | 8/1928 | Culver | 210/446 X |
| 3,386,585 | 6/1968 | Weyand et al. | 210/446 X |
| 3,803,810 | 4/1974 | Rosenberg | 210/446 X |
| 3,935,111 | 1/1976 | Bentley | 210/446 |
| 3,954,625 | 5/1976 | Michalski | 210/446 X |
| 4,056,100 | 11/1977 | Noiles | 210/446 X |

Primary Examiner—William A. Cuchlinski, Jr.
Attorney, Agent, or Firm—Gary Appel

[57] ABSTRACT

An isolator filter device having a microporous film membrane strengthened by a support screen, the membrane and screen being bonded between front and rear housing members. Each of the housings is generally funnel-shaped with the enlarged open ends thereof in facing relation. The rear housing is provided with a centrally disposed deflector portion in fluid communication with the exit spout thereof and a plurality of concentric support ribs to disperse the substance received from the supporting screen and membrane. The front and rear housing is at least partially transparent to provide visual monitoring of the isolator device.

8 Claims, 4 Drawing Figures

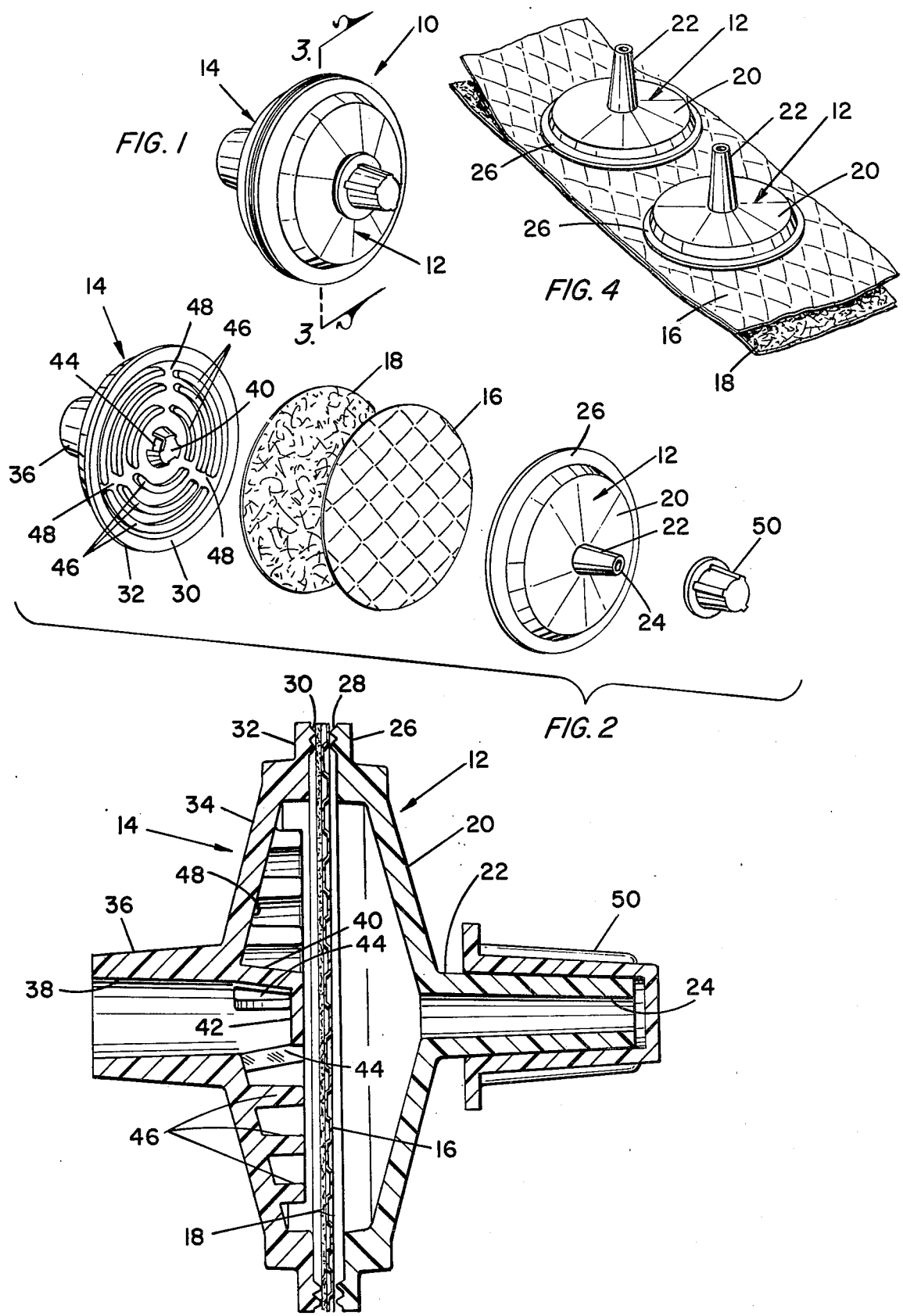

ISOLATOR FILTER

BACKGROUND OF THE INVENTION

The background of the invention will be discussed in two parts:

1. Field of the Invention

This invention relates to filtering devices and more particularly to filtering devices having a microporous film membrane capable of selectively passing substances therethrough.

2. Description of the Prior Art

Filtering devices of an in-line type are useful in medical applications to protect the patients. Such filters are utilized to cleanse or filter the substance being transmitted, be it a fluid or a gas such as air.

Recently, materials capable of selectively passing certain substances have been developed, one such material being a microporous polypropylene film manufactured and sold under the trademark CELGARD by Celanese Plastics Company of Roselle, New Jersey. This microporous film while allowing the flow of gases, vapors and under certain conditions, liquids, is an effective barrier to bacteria, colloidal particles and other submicron materials. Being a polypropylene material, the film can be thermally fused to itself or other materials by conventional sealing techniques such as jaw-type sealing, impulse sealing, radio frequency and ultrasonic sealing.

Accordingly, it is an object of this invention to provide a new and improved filter device utilizing a microporous film membrane.

It is another object of this invention to provide a new and improved filter isolator device.

It is a further object of this invention to provide a new and improved filter device which is economical to produce and effective in operation.

It is still another object of this invention to provide a new and improved filter device having means for supporting a relatively thin membrane with means for dispersing injected fluid generally uniformly from the filtering surface.

It is still another object of this invention to provide a new and improved fabrication means for strengthening microporous polyethylene film for use as a filter device.

SUMMARY OF THE INVENTION

The foregoing and other objects of the invention are accomplished by providing a filter device having first and second generally funnel-shaped housings with the enlarged openings thereof in facing relation and bonded together with a microporous film membrane therebetween. Disposed internally and in alignment with the spout portion of one of the housings is a deflector member for dispersing fluid radially outwardly with the interior surface provided with a plurality of concentric segmented ribs. The other housing has a generally smooth internal surface and is at least partially light transmitting. The membrane is provided with a support screen adjacent the ribbed housing portion, the support screen being formed of a polypropylene material with the two housings being secured to each other and to the membrane support screen by suitable means such as ultrasonic welding. Other objects, features and advantages of the invention will become apparent from a reading of the specifications when taken in conjunction with the drawings in which like reference numerals refer to like elements in the several views.

BRIEF DESCRIPTION OF THE DRAWINGS

FIG. 1 is a perspective view of the filter device according to the invention;

FIG. 2 is an exploded perspective view of the filter device of FIG. 1;

FIG. 3 is a cross sectional view of the filter device taken generally along line 3—3 thereof; and FIG. 4 is a perspective view illustrating two of such devices in partially fabricated condition during the manufacture thereof.

DESCRIPTION OF THE PREFERRED EMBODIMENT

Referring now to the drawings and particularly to FIG. 1–3 there is shown a filter device according to the invention, the device being generally designated 10 and having a front housing generally designated 12, a rear housing generally designated 14, a microporous film membrane 16 and a support screen 18. The membrane 16 is a microporous film of polypropylene material of the type sold by Celanese Plastics Company under the trademark "CELGARD", and is of a thickness of approximately one mil. Such material when subjected to pressures of fluids passing therethrough may tend to burst if the pressures exceed normal limits. A support screen 18, similarly of polypropylene material, is provided to reinforce the membrane 16 with the support screen 18 being bonded to the surface of membrane 16. The support screen 18 is a support mesh providing protection for the membrane during manufacturing and use, the membrane permits the transmission of fluids or substances there-through with the selectivity of passage through the combined membrane element being determined by the characteristics of the microporous filter material of membrane 16.

Each of the housings 12 and 14 is generally funnel-shaped with an enlarged end of relatively small depth and a funnel portion. For example housing 12 has the conical portion 20 with the spout portion 22 integral therewith with the opening 24 thereof being generally centrally located with respect to the outer periphery of the conical portion 20. The enlarged end opening of conical portion 20 terminates in a peripheral flange 26 which is provided on the outer edge thereof with a circumferentially extending pair of ribs 28. The periphery of flange 26 on which ribs 28 are located is a generally planar edge adapted to coact with ribs 30 formed on the generally planar edge of flange 32 of housing 14. Housing 14 likewise has a conical portion 34 and a spout portion 36 which is larger in diameter than the spout portion 22. The opening 38 extending through spout portion 36 is tapered with a decreasing diameter from the outer edge of spout 36 toward the interior thereof. Formed integrally on the interior of the conical portion 34 of housing 14 is a deflector member 40 which is generally cup-shaped with the closed end 42 thereof in the path of any substance flowing through the opening 38. Disposed in the periphery of the cup-shaped deflector member 40 are three slotted openings 44 which are facing radially outwardly relative to the longitudinal center line of opening 38. The inner surface of conical portion 34 of housing 14 is provided with a plurality of concentric segmented ribs 46 which are disposed about two or three different radii with the edges of the ribs 46 adjacent the support screen 18 terminating in a common plane spaced from but in proximate relation to the support screen 18. As best illustrated in FIG. 2, there are three slotted openings 44 in the deflector member 40 with each of the slotted openings being angularly disposed approximately 120° relative to each other. Similarly, between adjacent edges of the arcuate segments or ribs 46, three pathways 48 are defined, each of the pathways 48 being disposed angularly 120° relative to each other and being offset half the distance, or 60°, from the orientation of the slotted openings 44 of the deflector member 40.

Referring specifically to FIG. 3, to assemble the filter device 10 the microporous film membrane 16 is disposed adjacent and in abutting relation with the support screen 18 with the support screen 18 facing toward the enlarged open end of housing 14. The housing 12 is then disposed in abutting relation with the membrane 16 with the ribs 28 and 30 of housings 12 and 14 respectively positioned in abutting relation whereupon the flanges 26 and 32 are suitably secured to each other and to the membrane 16 and support mesh 18 by any suitable method such as ultrasonic welding, resulting in a hermetically sealed peripheral edge. The housings 12 and 14 are likewise formed of polypropylene material with the outer diameters of flanges 26 and 32 being substantially identical with the ribs 28 and 30 likewise being substantially identical in dimension and orientation relative to each other. The ribs 28 and 30 act as welding beads which allow the housing to vent air while being welded to the membrane 16 and support mesh or screen 18. A protective cap 50 is provided for enclosing spout 22 of housing 12 to seal the unit until used and prevent contamination of the membrane 16. Either of the housings 12 and 14 may be formed of an at least partially light transmitting polypropylene material to permit visual monitoring of the filter device when solution is entering it.

In operation, should a substance be injected into the opening 24 of housing 12, in the absence of the deflector member 40, the substance entering into spout 24 would pass through the microporous film membrane 16 and then through the support screen 18 which has sufficient rigidity to withstand the pressure. As the substance passes through the microporous film membrane 16 resistive pressure is exerted against the microporous film membrane 16 and against the support screen 18, thereby deforming them in the direction of flow of the fluid or substance. With the deflector member 40 having the closed end 42 thereof in direct line with the path of flow of the fluid or substance, the substance would be directed radially outwardly through the three slotted openings 44 toward the adjacent arcuate segmented ribs 46 in direct line with the openings. The segments 46 would then redirect the fluid or substance, again radially outwardly through the pathways 48 to thereby assist in dispersing the substance evenly from the filtering surface to thereby prevent the supported microporous membrane from bursting.

Conversely, if a solution is introduced through the opening 38 of the spout 36 of the other housing 14, the solution or substance will come into contact with the unbonded side of the membrane 16 with pressure thereagainst being resisted by the reinforcing support screen 18. Furthermore, the inner diameter of opening 38 is larger than the diameter of opening 38 of spout 22 of housing 12. This enlarged diameter of the tapered opening 38 likewise assists in reducing the pressure in the direction of the supported side of the microporous film membrane 16.

FIG. 4 illustrates a method of assembling devices according to the invention wherein the support screen 18 and the membrane 16 are formed in strips of identical width of slightly larger dimension than the overall diameter of the housing 12 and 14. While only two filter devices 10 are illustrated, it is to be understood that a plurality of such devices could be assembled at the same time or in sequence in accordance with the length of the strip of material used. After the welding operation is performed to seal the housings 12 and 14 to each other and to the support screen 18 the membrane 16, a cutting operation is performed to remove the excess material.

In overall dimension, the filter device 10 has an outer diameter of less than 1.25 inches with a distance between the ends of spouts 22 and 36 being less than one inch. Consequently, the filtering device is of small dimension and compact for use while being effective as a device isolator which will allow monitoring to take place while filtering a virus down to approx. 50 angstroms. It can be used as a line filter in respiratory care and can also be used for venting a system or introducing sterile air to a system. The sizes illustrated are typical but not controlling, and the filter device or isolator can be made in several sizes to accommodate different systems and their flow characteristics. While there has been shown and described a preferred embodiment it is to be understood that various other adaptations and modifications may be made within the spirit and scope of the invention.

What is claimed is:

1. In a filter device, the combination comprising:
first and second generally funnel-shaped housings, each of said housings having a generally conical portion and a spout portion with an aperture extending therethrough, the outer peripheries of said first and second housings being generally identically configured;
a microporous film membrane having a dimension generally equal to the dimension of said periphery;
porous support means configured for abuttingly engaging said membrane;
means securing the peripheries of said first and second housings together with said membrane and said support means interposed therebetween;
a generally cup-shaped deflector member secured to the interior of the conical portion of one of said housings with the bottom of said deflector member in general alignment with the aperture of the spout portion of said housing, said deflector member having a plurality of radially outwardly disposed openings for passage of fluid therethrough; and
rib means on the inner surface of the conical portion of said housing in radial relation to said openings, said deflector member and said rib means dispersing fluid injected into said housing generally radially for uniformly dispersing such fluid over the surface of said support means.

2. The combination according to claim 1 wherein at least one of said housings is formed of an at least partially light transmitting material.

3. The combination according to claim 1 wherein said rib means include a plurality of arcuate segments arranged concentrically relative to the axis of said aperture.

4. The combination according to claim 3 wherein said deflector member has three openings and an arcuate segmented rib is positioned radially relative to each of said openings in the path of flow of the fluid.

5. The combination according to claim 4 wherein the aperture in said housing having said deflector member has a larger diameter than the aperture in the other housing member.

6. The combination according to claim 5 wherein said first and second housing members are formed of a polypropylene material having the peripheries thereof bonded together.

7. The combination according to claim 6 wherein said support means is a polypropylene support mesh and said membrane is formed of a polypropylene material with said membrane and said support mesh being bonded at the juncture of said first and second housings.

8. The combination according to claim 1 wherein said support means is a polypropylene support mesh and said membrane is formed of a polypropylene material with said membrane and said support mesh being bonded at the juncture of said first and second housings.

* * * * *